(12) United States Patent
Kashima et al.

(10) Patent No.: US 9,700,985 B2
(45) Date of Patent: Jul. 11, 2017

(54) GLASS PLATE AND METHOD FOR MANUFACTURING THE GLASS PLATE

(71) Applicant: ASAHI GLASS COMPANY, LIMITED, Chiyoda-ku (JP)

(72) Inventors: Izuru Kashima, Tokyo (JP); Yusuke Kobayashi, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 495 days.

(21) Appl. No.: 14/189,117

(22) Filed: Feb. 25, 2014

(65) Prior Publication Data

US 2014/0170388 A1 Jun. 19, 2014

Related U.S. Application Data

(63) Continuation of application No. PCT/JP2012/070825, filed on Aug. 16, 2012.

(30) Foreign Application Priority Data

Aug. 29, 2011 (JP) ................................. 2011-186460

(51) Int. Cl.
*C03C 19/00* (2006.01)
*B24B 9/10* (2006.01)
(Continued)

(52) U.S. Cl.
CPC ................ *B24B 9/10* (2013.01); *C03C 15/00* (2013.01); *C03C 19/00* (2013.01); *C03C 21/002* (2013.01);
(Continued)

(58) Field of Classification Search
None
See application file for complete search history.

(56) References Cited

U.S. PATENT DOCUMENTS 5,733,622 A * 3/1998 Starcke ................. C03C 21/008
270/58.27
5,846,280 A * 12/1998 Speit ....................... C03C 3/095
501/54
(Continued)

FOREIGN PATENT DOCUMENTS

JP 2007-118173 5/2007
JP 2008-254086 10/2008
(Continued)

OTHER PUBLICATIONS

U.S. Appl. No. 14/189,072, filed Feb. 25, 2014, Kashima, et al.
(Continued)

*Primary Examiner* — David Sample
*Assistant Examiner* — Donald M Flores, Jr.
(74) *Attorney, Agent, or Firm* — Oblon, McClelland, Maier & Neustadt, L.L.P.

(57) ABSTRACT

A glass plate includes two main flat surfaces, and a side surface adjacent to the two main flat surfaces. At least one edge part of the side surface includes a chamfered part in a thickness direction of the glass plate. The side surface includes a predetermined portion. In a case where the predetermined portion is etched with a depth of 10 μm, an etched surface of the predetermined portion includes no pit having a depth greater than or equal to 1 μm. The predetermined portion is a portion of the side surface in which a distance from one of the two main flat surfaces adjacent to the chamfered part in the thickness direction of the glass plate is less than or equal to ⅕ of the thickness of the glass plate.

5 Claims, 8 Drawing Sheets

(51) Int. Cl.
*C03C 15/00* (2006.01)
*C03C 21/00* (2006.01)
*G02F 1/1333* (2006.01)

(52) U.S. Cl.
CPC ............ *G02F 2001/133302* (2013.01); *G02F 2001/133331* (2013.01); *Y10T 428/24488* (2015.01)

(56) References Cited

U.S. PATENT DOCUMENTS

| | | | | |
|---|---|---|---|---|
| 2002/0197437 | A1* | 12/2002 | Hashimoto | C03C 19/00 428/848.2 |
| 2007/0209301 | A1* | 9/2007 | Memari | E04B 2/96 52/204.5 |
| 2010/0206008 | A1* | 8/2010 | Harvey | C03B 33/0222 65/105 |
| 2010/0291353 | A1* | 11/2010 | Dejneka | C03B 33/0222 428/192 |
| 2011/0019123 | A1* | 1/2011 | Prest | C03C 19/00 349/58 |
| 2011/0123834 | A1 | 5/2011 | Hoshino et al. | |
| 2011/0195638 | A1* | 8/2011 | Sasaki | H01L 21/67028 451/36 |

FOREIGN PATENT DOCUMENTS

| | | |
|---|---|---|
| JP | 2008-302448 | 12/2008 |
| JP | 2011-86371 A | 4/2011 |
| JP | 2011-148685 | 8/2011 |
| JP | 2011-156627 A | 8/2011 |
| WO | 2010/104039 | 9/2010 |
| WO | 2011/089990 | 7/2011 |

OTHER PUBLICATIONS

U.S. Appl. No. 12/953,910, filed Nov. 24, 2010, Hoshino, et al.
International Search Report issued Nov. 6, 2012 in PCT/JP2012/070825 filed Aug. 16, 2012.

* cited by examiner

GLASS PLATE AND METHOD FOR MANUFACTURING THE GLASS PLATE

CROSS-REFERENCE TO RELATED APPLICATION

This application is a U.S. continuation application filed under 35 USC 111(a) claiming benefit under 35 USC 120 and 365(c) of PCT Application JP2012/070825, filed Aug. 16, 2012, which claims the benefit of priority of Application Ser. No. 2011-186460, filed in Japan on Aug. 29, 2011. The foregoing applications are hereby incorporated herein by reference.

BACKGROUND OF THE INVENTION

1. Field of the Invention

The present invention generally relates to a glass plate and a method for manufacturing the glass plate.

2. Description of the Related Art

In recent years, glass plates have been manufactured for the use of image display apparatuses such as liquid crystal displays and organic EL (Electro Luminescence) displays. For example, a glass substrate may be used as a glass plate on which a function layer such as a thin film transistor (TFT) or a color filter (CF) is formed. Further, a glass plate may be used as a cover glass for improving the aesthetics of a display or increasing protection of the display.

As a method for strengthening a glass plate, a chemical strengthening method is developed. With the chemical strengthening method, a chemically strengthened layer (compression stress layer) having a predetermined depth from a front surface of a glass plate is formed on the glass plate by using a process liquid used for ion-exchange. A tensile stress layer is formed inside the chemically strengthened glass plate for maintaining balance of stress.

In a case where a glass plate is bent, compression stress is generated in a main flat surface corresponding to a concave surface of the glass plate whereas a tensile stress is generated in a main flat surface corresponding to a convex surface of the glass plate. In this case, when a minute scratch exists at a border part between the main flat surface corresponding to the convex surface of the glass plate and an end surface adjacent to the main flat surface corresponding to the convex surface of the glass plate, the scratch may become the cause for breakage of the glass plate.

Therefore, there is proposed a glass plate including a chamfered surface formed at the border part in which a valley part of the chamfered surface has a maximum valley depth Rv less than or equal to 2 μm (see, for example, International Publication Pamphlet 10/104,039). In a case where the maximum valley depth Rv is less than or equal to 2 μm, the valley part can be prevented from being torn by controlling the stress concentrating on the trough part. Thereby, breakage of the glass plate can be prevented. International Publication Pamphlet 10/104,039 also proposes a glass plate in which the valley part of a chamfered surface has a projecting valley depth Rvk less than or equal to 0.95 μm.

When an end surface of a glass plate is grinded by a rotating grinding wheel, a micro-scratch may be formed on the end surface. The micro-scratch is a minute scratch that is difficult to visually recognize. The micro-scratch may cause degradation of flexural strength of a glass plate. Because micro-scratches are likely to be formed inside the glass plate, accurate evaluation of, for example, flexural strength cannot be performed based on the above-described depth Rv or depth Rvk.

SUMMARY OF THE INVENTION

The present invention may provide a glass plate and a method for manufacturing the glass plate that substantially obviate one or more of the problems caused by the limitations and disadvantages of the related art. Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a glass plate and a method for manufacturing the glass plate particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a glass plate including two main flat surfaces, and a side surface adjacent to the two main flat surfaces. At least one edge part of the side surface includes a chamfered part in a thickness direction of the glass plate. The side surface includes a predetermined portion. In a case where the predetermined portion is etched with a depth of 10 μm, an etched surface of the predetermined portion includes no pit having a depth greater than or equal to 1 μm. The predetermined portion is a portion of the side surface in which a distance from one of the two main flat surfaces adjacent to the chamfered part in the thickness direction of the glass plate is less than or equal to ⅕ of the thickness of the glass plate. Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

<First Embodiment>

The first embodiment pertains to a glass plate including a chamfered part. A method for manufacturing the glass plate is described in the following second to fourth embodiments.

Figure 1:
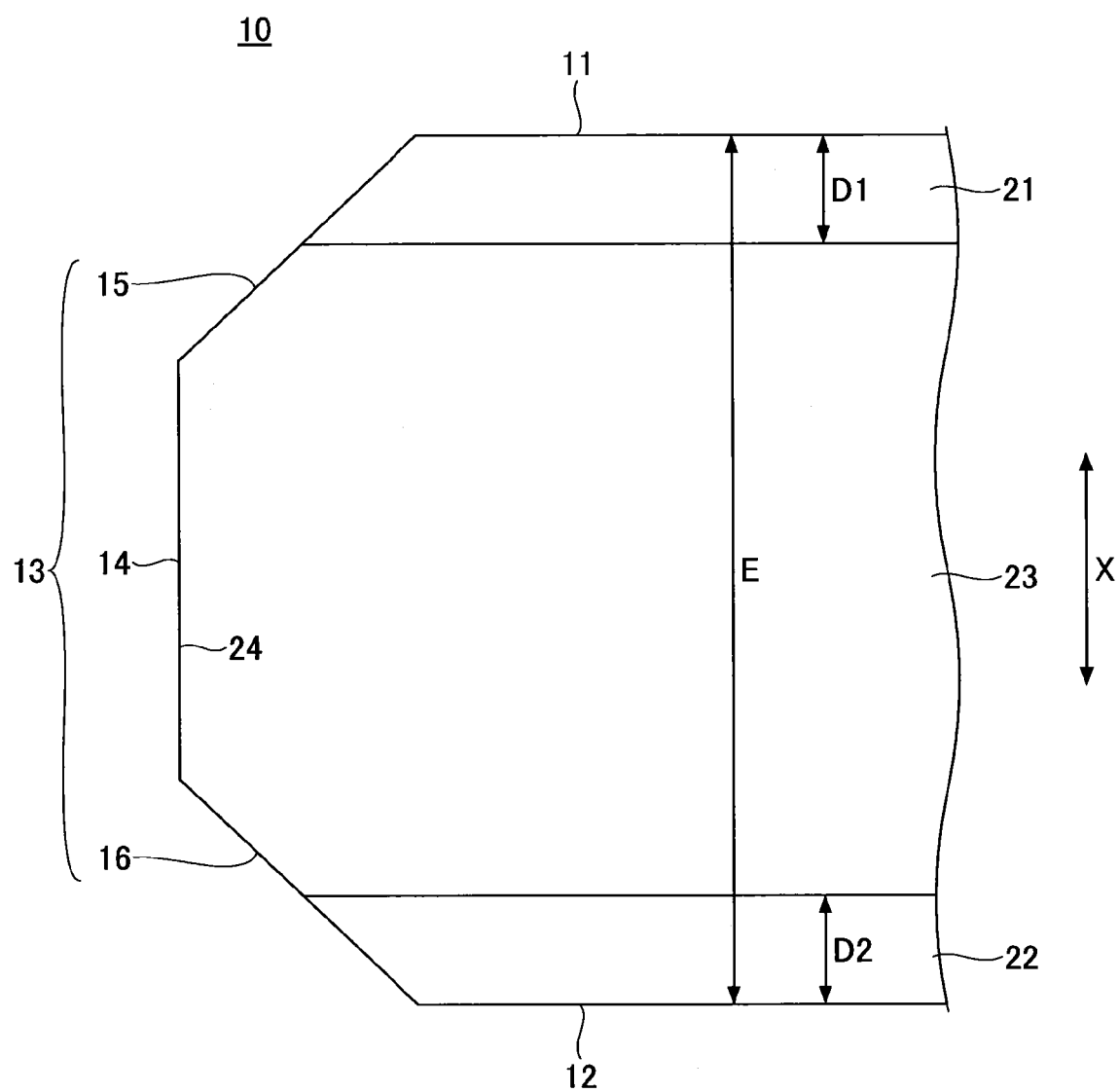
FIG. 1 is a side view illustrating a glass plate according to a first embodiment of the present invention.

FIG. 1 is a side view illustrating a glass plate according to the first embodiment of the present invention. In the drawings including FIG. 1, direction "X" indicates a plate thickness direction of a glass plate.

The glass plate 10 may be a glass substrate used for an image display apparatus or a cover glass. The image display apparatus may be, for example, a liquid crystal display (LCD), a plasma display panel (PDP), an organic EL (Electro Luminescence) display, or a touch panel.

The type of glass that forms the glass plate 10 may be set according to the usage of the glass plate 10. For example, in a case where the glass plate 10 is used for a glass substrate, alumino-borosilicate glass or alkali alumino-silicate glass may be used to form the glass plate 10. In a case where the glass plate 10 is used for a cover glass, soda-lime glass or alkali alumino-silicate glass may be used to form the glass plate 10.

It is to be noted that, although the glass plate in this embodiment is used for an image display apparatus, the usage of the glass plate 10 is not to be limited in particular. For example, the glass plate 10 may be used for a solar battery or a thin-film secondary battery.

The plate thickness E of the glass plate 10 may be set according to the usage of the glass plate 10. For example, in a case where the glass plate 10 is used as a glass substrate for an image display apparatus, the plate thickness E of the glass plate 10 is 0.2 mm to 3 mm. Further, in a case where the glass plate 10 is used as a cover glass for an image display apparatus, the plate thickness E of the glass plate 10 is, for example, 0.5 mm to 3 mm. However, the plate-thickness of the glass plate 10 is not limited to the aforementioned plate-thicknesses.

The glass plate 10 may be formed by using a float method, a fusion down-draw method, a redraw method, or a press method. However, the method for forming the glass plate 10 is not limited to the aforementioned methods.

The glass plate 10 includes two main flat surfaces 11, 12, and a side surface 13 adjacent to the two main flat surfaces 11, 12. The two main flat surfaces 11, 12 are flat surfaces that are parallel to each other.

The main flat surfaces 11, 12 may be formed in a rectangular shape. Here, the term "rectangular shape" includes both a quadrate shape and an oblong shape. Further, corner portions of the rectangular shaped main flat surfaces 11, 12 may have rounded shapes. It is to be noted that the shape of the main flat surfaces 11, 12 is not limited to the aforementioned shapes. For example, the main flat surfaces 11, 12 may have polygonal shapes such as triangular shapes. Alternatively, the main flat surfaces 11, 12 may have a circular shape or an elliptical shape.

The side surface 13 includes a flat part 14 that is orthogonal to the two main flat surfaces 11, 12, and chamfered parts 15, 16 formed between the flat part 14 and corresponding main flat surfaces 11, 12. The chamfered part 15 is adjacent to the main flat surface 11 and the flat part 14. Similarly, the chamfered part 16 is adjacent to the main flat surface 12 and the flat part 14.

The flat part 14 may be a cross-sectional surface obtained by cutting a plate glass having an area larger than an area of the glass plate 10. Alternatively, the flat part 14 may be a processed surface obtained by processing the cross-sectional surface.

For example, four chamfered parts 15, 16 may be provided on corresponding four sides of the rectangular-shaped main flat surfaces 11, 12. Alternatively, a single chamfered part 15 or 16 may be provided on one of the sides of the rectangular-shaped main flat surfaces 11, 12. The number of the chamfered parts 15, 16 which may be provided is not limited to the aforementioned number of chamfered parts provided on the side(s) of the rectangular shaped main flat surfaces 11, 12.

The chamfered parts 15, 16 may formed by removing corner parts of the cross-sectional surface and the main flat surfaces 11, 12. Each of the chamfered parts 15, 16 is a flat surface or a curved surface that forms an angle greater than 0 degrees but less than 90 degrees with respect to corresponding main flat surfaces 11, 12. Although the chamfered parts 15, 16 generally have the same dimensions, the chamfered parts 15, 16 may be have different dimensions.

It is to be noted that, although the chamfered parts 15, 16 are flat surfaces that are diagonal with respect to the main flat surfaces 11, 12, the chamfered parts 15, 16 may be curved surfaces (bent surfaces) that gradually protrude outward from corresponding main flat surfaces 11, 12 to the flat part 14. In a case where the chamfered parts 15, 16 are curved surfaces (bent surfaces), the flat part 14 may be omitted, so that the chamfered parts 15, 16 are connected to each other. In this case, the chamfered parts 15, 16 may have substantially the same curvature radius.

The glass plate 10 may have compression stress layers (chemically strengthened layers) 21, 22 provided on its respective main flat surfaces 11, 12. Each of the compression stress layers 21, 22 is formed with a predetermined depth from corresponding main flat surfaces 11, 12. In forming the compression stress layers 21, 22, glass is immersed into a process liquid used for ion-exchange. Thereby, ions that have small ion radii and are contained in a surface of the glass (e.g., Li ions, Na ions) are replaced with ions that have large ion radii (e.g., K ions). As a result, the compression stress layers 21, 22 are formed having a predetermined depth from the surface of the glass. A tensile stress layer 23 is formed inside the glass for maintaining balance of stress.

From the standpoint of production efficiency, multiple glass plates 10 including the compression stress layers 21, 22 may be obtained by, for example, chemically strengthening a plate glass having a larger area than the glass plate 10, then cutting the plate glass into multiple glass plates, and then chamfering at least one of the outer peripheral edges of the main flat surfaces of the multiple glass plates.

A common method such as a scribe-and-break method or a laser cutting method may be used for cutting the chemically strengthened plate glass. With the scribe-and-break method, first, a scribe line (groove line) is formed by moving a scribe cutter while pressing the scribe cutter against a surface of a plate glass. After the scribe line is formed, the plate glass is cut (broken) by bending the plate glass. With the laser cutting method, a laser beam is radiated to a surface of a plate glass while moving a radiation area on the plate glass, so that the plate glass is cut (divided) by thermal stress. As a heat source for applying the thermal stress to the plate glass, a discharge electrode may be used instead of a laser source. In a case where such heat source is used, a cross-sectional surface with hardly any micro-scratches can be obtained.

In a case where the chemically strengthened plate glass is cut, the tensile stress layer 23 becomes exposed from the side surface 13 of the glass plate 10. Therefore, tensile stress caused by chemically strengthening remains in an area 24 (hereinafter also referred to as "tensile stress remaining area") of the side surface 13 of the glass plate 10. As illustrated in FIG. 1, the tensile stress remaining area 24 may exist throughout the flat part 14, the chamfered part 15, and the chamfered part 16 or exist only in the flat part 14.

Figure 2:
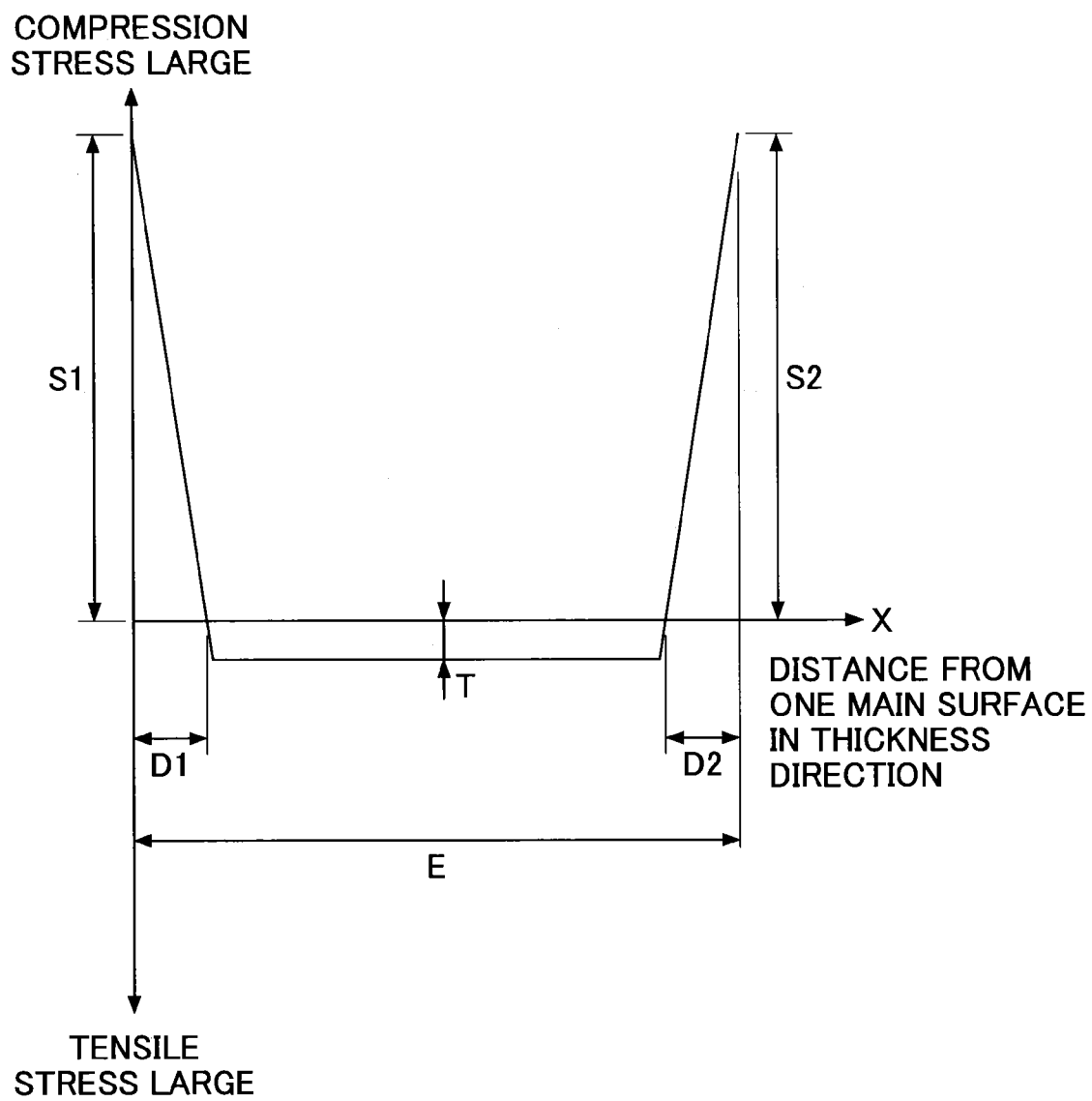
FIG. 2 is a schematic diagram illustrating distribution of residual stress in a thickness direction of a chemically strengthened glass plate.

FIG. 2 is a schematic diagram illustrating distribution of residual stress in a thickness direction of a chemically strengthened glass plate. As illustrated in FIG. 2, residual compression stress of the compression stress layers 21, 22 (see FIG. 1) tends to gradually decrease from both main flat surfaces 11, 12 to a center part of the glass plate 10 in the plate thickness direction. Further, residual tensile stress of the tensile stress layer 23 (see FIG. 1) is substantially constant.

In FIG. 2, "S1" and "S2" indicate residual compression stresses in the respective main flat surfaces 11, 12 (hereinafter also referred to as "surface compression stress"); "D1" and "D2" indicate the thicknesses of the respective compression stress layers 21, 22; and "T" indicates an average value of residual tensile stress in the tensile stress layer 23 (hereinafter also referred to as "average tensile stress"). It is to be noted that S1, S2 (S2=S1), D1, D2 (D2=D1), and T may be adjusted according to, for example, the concentration or the temperature of the process liquid used for ion exchange or the time of immersion of the process liquid used for ion exchange. Further, S1, S2, D1, and D2 are measured with, for example, a commercially available surface stress meter in a state where the glass plate 10 is cooled to room temperature. Then, T is obtained by substituting the measurement results and E into the following Expression (1).

$$T=(S1\times D1/2+S2\times D2/2)/(E-D1-D2) \quad \text{Expression (1)}$$

"E", which is measured by using, for example, a microgauge, satisfies a relationship of E>D1+D2.

It is to be noted that, although the compression stress layers 21, 22 have same compression stress and same thickness in this embodiment, the compression stress layers 21, 22 may have different compression stresses and different thicknesses.

The surface compression stresses S1, S2 may be arbitrarily set according to, for example, the usage of the glass plate 10. In order to attain satisfactory strength and scratch resistance, the surface compression stress S1, S2 of at least one of the main flat surfaces 11, is greater than or equal to 500 MPa. From the standpoint of efficiency of the chemical strengthening process, each of the surface compression stresses S1, S2 may be less than or equal to 900 MPa. Each of the surface compression stresses S1, S2 is preferably 550 MPa to 850 MPa, and more preferably 600 MPa to 800 MPa. The thicknesses D1, D2 may be arbitrarily set according to, for example, the usage of the glass plate 10. For example, the thickness D1, D2 of at least one of the compression stress layers 21, 22 is greater than or equal to 10 μm. From the standpoint of efficiency of the chemical strengthening process, each of the thicknesses D1, D2 may be less than or equal to 60 μm. Each of the thicknesses D1, D2 is preferably 15 μm to 50 μm, and more preferably 20 μm to 40 μm.

Figure 3:
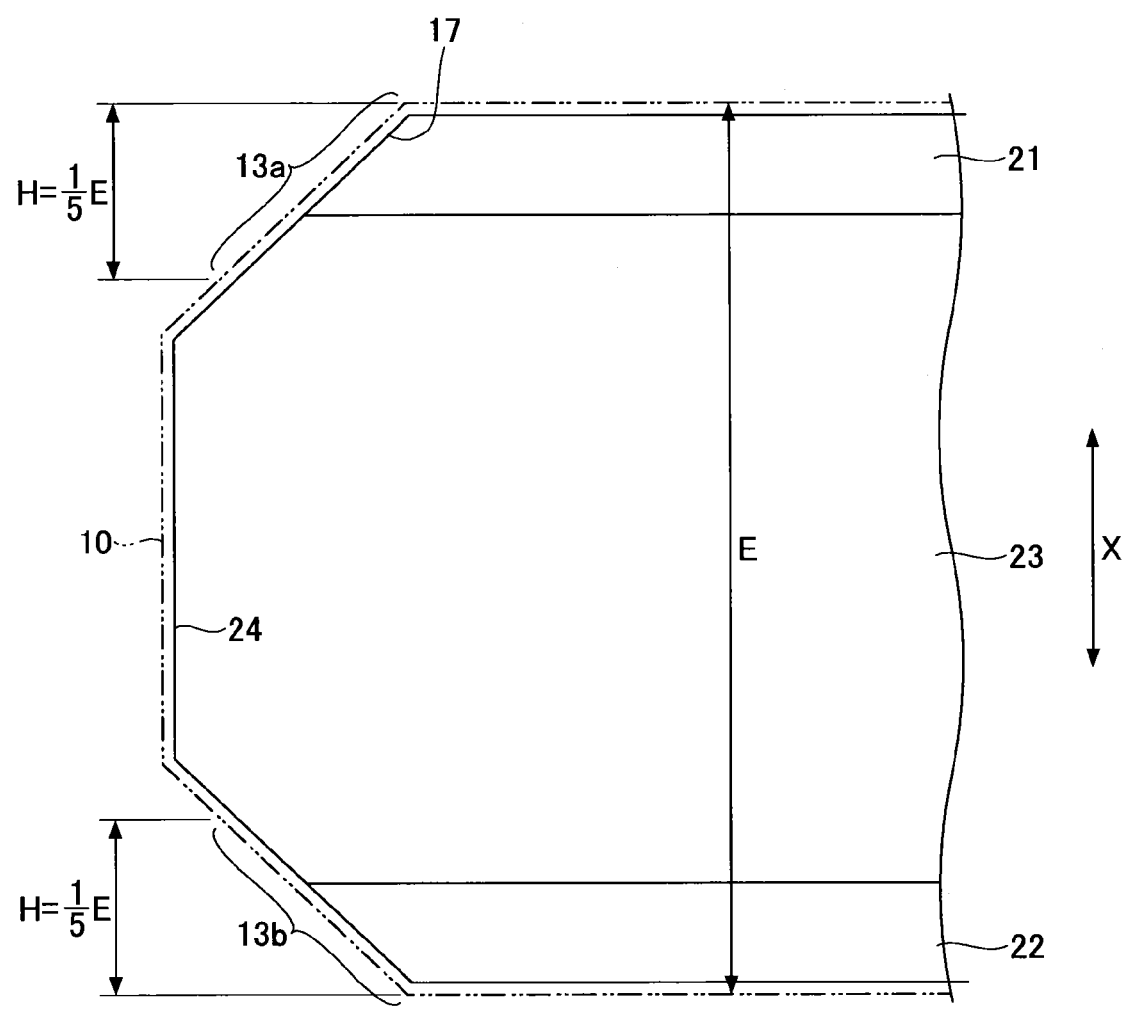
FIG. 3 is a schematic diagram illustrating a state of a glass plate after etching the glass plate according to an embodiment of the present invention.
Figure 4:
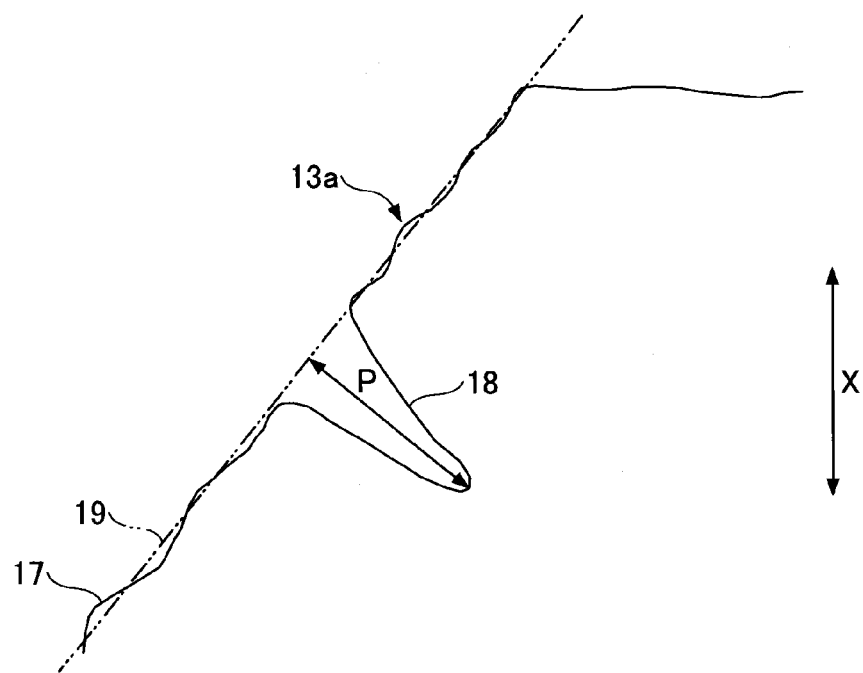
FIG. 4 is an enlarged view illustrating a portion of FIG. 3 for describing a relationship between an etched surface, a pit formed in the etched surface, and an ideal surface of the etched surface according to an embodiment of the present invention.

FIG. 3 is a schematic diagram illustrating a state of a glass plate after etching the glass plate according to an embodiment of the present invention. In FIG. 3, a solid line indicates a state of the glass plate 10 after etching the glass plate 10 whereas a dash-double dot line indicates a state of the glass plate 10 before etching the glass plate 10. FIG. 4 is an enlarged view illustrating a portion of FIG. 3 for describing a relationship between an etched surface 17, a pit 18 formed in the etched surface 17, and an ideal surface 19 of the etched surface 17.

According to this embodiment, when each of the predetermined portions 13a, 13b of the side surface 13 are etched with a depth of 10 μm, no pit 18 having a depth greater than or equal to 1 μm (preferably greater than or equal to 0.8 μm, and more preferably greater than or equal to 0.6 μm) is formed in the etched surfaces 17 of the predetermined portions 13a, 13b of the side surface 13. The predetermined portion 13a is a portion of the side surface 13 in which a distance H from the main flat surface 11 (adjacent to the chamfered part 15) in the thickness direction of the glass plate 10 is less than or equal to ⅕ of the plate thickness E (H≤⅕×E). Likewise, the predetermined portion 13b is a portion of the side surface 13 in which a distance H from the main flat surface 12 (adjacent to the chamfered part 16) in the thickness direction of the glass plate 10 is less than or equal to ⅕ of the plate thickness E (H≤⅕×E).

In this embodiment, the etching process is performed by immersing the entire glass plate 10 in an etching liquid at room temperature (25° C.). The etching liquid may be, for example, an aqueous solution including 5% by mass of hydrofluoric acid (HF) and 95% by mass of pure water. The etching liquid enters the micro-scratches formed on a front surface of the glass plate 10 or inside the glass plate 10 and widens the micro-scratches, so that the micro-scratches become more visible.

The etching amount (depth of etching) is controlled by adjusting the immersion time. More specifically, first, an etching rate is calculated beforehand by preparing a glass having the same composition as the glass plate 10 and etching the glass for a predetermined time. Then, the glass plate 10 is etched by adjusting the immersion time, so that the glass plate 10 is etched for a desired amount. It is to be noted that the concentration of the hydrofluoric acid may be changed for adjusting the etching rate in accordance with the type of glass.

The depth P of the pit 18 may be obtained based on a method for measuring a projecting valley depth Rvk defined in JIS B0671-2:2002.

It is to be noted that the target for evaluating the existence of pits 18 having a depth greater than or equal to 1 μm is limited to the predetermined portions 13a, 13b because any existence of micro-scratches formed in the predetermined portions 13a, 13b may become the source of breakage of the glass plate 10.

In this embodiment, no pits 18 having a depth greater than or equal to 1 μm exist in the predetermined portions 13a, 13b in a case where the predetermined portions 13a, 13b are etched with a depth of 10 μm. Because no deep micro-scratches that become the source of breakage of the glass plate 10 exist, flexural strength of the glass plate 10 is improved. In a case where the glass plate 10 is chemically strengthened, flexural strength of the glass plate 10 can be further improved.

In a case where the glass plate 10 is cut after being chemically strengthened, the tensile stress remaining area 24 is exposed from the side surface 13 of the glass plate 10. Although tensile stress causes degradation of flexural strength, such degradation of flexural strength can be prevented in this embodiment because no deep micro-scratches that cause breakage of the glass plate 10 exist in the predetermined portions 13a, 13b. This effect is evident particularly in an area in which the tensile stress remaining area 24 partly superposes the predetermined portions 13a, 13b in the X direction. In this case, the glass plate 10 attains a flexural strength greater than or equal to 300 MPa.

In the above-described embodiment, the glass plate 10 is formed by chemically strengthening a plate glass, then cutting the plate glass, and then chamfering the plate glass. However, the glass plate 10 may be formed differently from the above-described embodiment. For example, in an alternative case, the glass plate 10 may be formed by cutting a plate glass, then chamfering the plate glass, and then chemically strengthening the plate glass. In this alternative case, the glass plate 10 having high flexural strength can be obtained because the entire glass plate 10 is covered by a chemically strengthening layer. Alternatively, the glass plate 10 may be formed without a chemically strengthening layer.

<Second Embodiment>

The following embodiment relates to a method for manufacturing a glass plate including a chamfered part.

Figure 5:
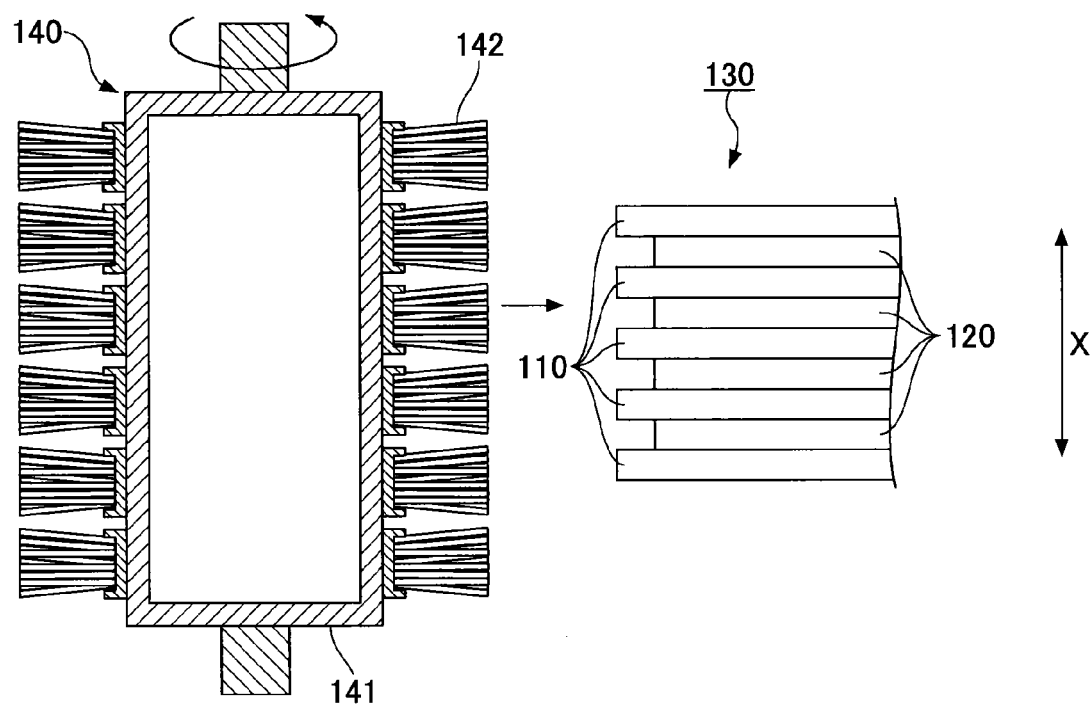
FIG. 5 is a schematic diagram for describing a method for manufacturing a glass plate according to a second embodiment of the present invention (1)
Figure 6:
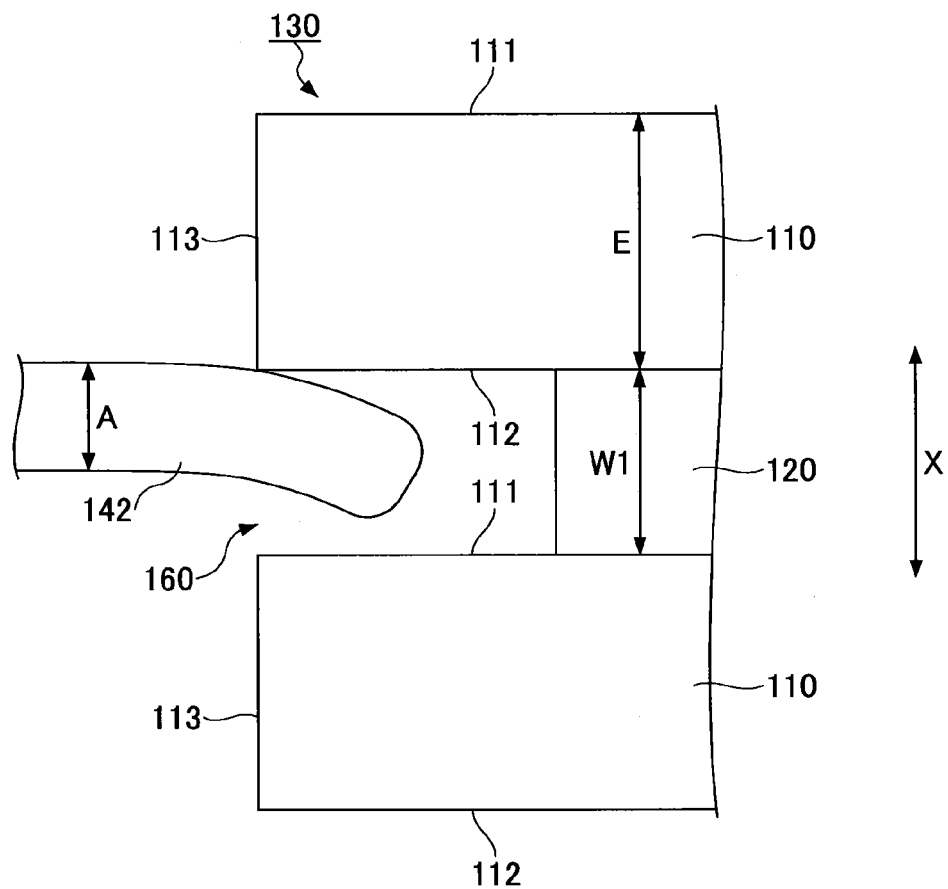
FIG. 6 is a schematic diagram for describing a method for manufacturing a glass plate according to the second embodiment of the present invention (2)
Figure 7:
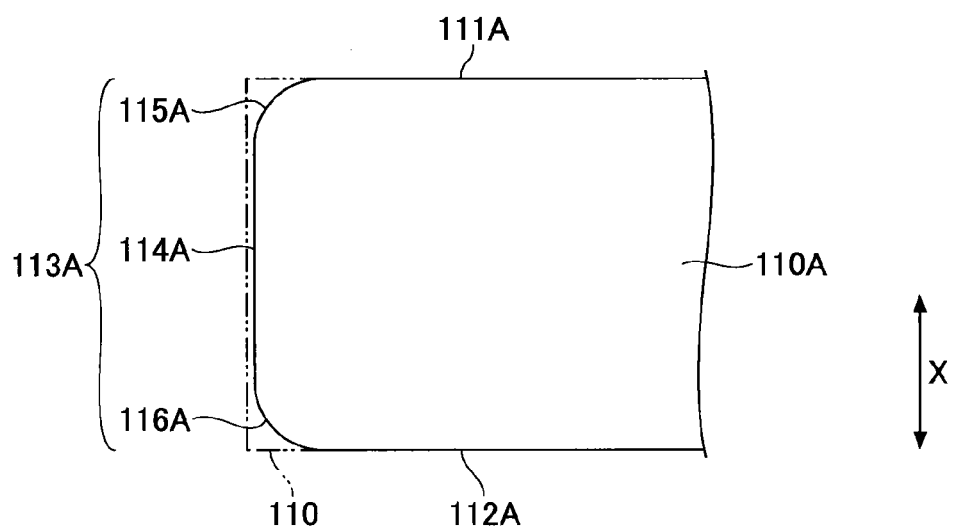
FIG. 7 is a schematic diagram for describing a method for manufacturing a glass plate according to the second embodiment of the present invention (3)

FIGS. 5 to 7 are schematic diagrams for describing a method for manufacturing a glass plate according to a second embodiment of the present invention. FIG. 5 illustrates a layered body 130 including glass plates (raw plates) 110 and a brush 140 for polishing an outer edge of the layered body 130. FIG. 6 is an enlarged view illustrating a state where the outer edge of the layered body 130 is polished with the brush 140. FIG. 7 illustrates the glass plate 110 in which a solid line indicates a state of the glass plate 110 after polishing (brushing) the glass plate 110 with the brush 140 whereas a dash-double dot line indicates a state of the glass plate 110 before polishing (brushing) the glass plate 110 with the brush 140.

The method for manufacturing a glass plate includes a step of forming the layered body 130 by arranging spacers 120 between the glass plates 110 and a step of polishing the outer edge part of the layered body 130 with the brush 140. Further, the method for manufacturing a glass plate also includes a step of separating the spacers 120 and the glass plates 110A obtained by polishing the glass plates 110 with the brush 140.

As illustrated in FIG. 5, the layered body 130 includes multiple glass plates 110 and plate-like spacers 120 interposed between the multiple glass plates 110. The glass plates 110 and the spacers 120 are alternately provided one on top of the other and fixed to each other by being held (sandwiched) with a jig such as a clamp. In order to prevent the glass plates 110 from being damaged, protection sheets may be provided between the glass plates 110 and the spacers 120. The protection sheet is formed of, for example, resin.

It is to be noted that, although the glass plates 110 and the spacers 120 are fixed to each other with a jig according to this embodiment, the method for fixing the glass plates 110 and the spacers 120 is not limited to above-described method. For example, the fixing method may be a method of adhering the glass plates 110 and the spacers 120 to each other with an adhesive agent. The adhesive agent is to be removable during the separation step after the polishing step. For example, the adhesive agent may be a thermal softening resin. Instead of forming adhesive agent layers between the glass plates 110 and the spacers 120, the spacers 120 themselves may be used as adhesive agent layers.

Each of the glass plates 110 may be obtained by, for example, chemically strengthening a plate glass having a larger area than the glass plate 110, then cutting the plate glass into multiple glass plates, and then chamfering the multiple glass plates. The type of plate glass, the chemical strengthening method of the plate glass, and the cutting method of the plate glass of the second embodiment are the same as those described in the first embodiment and are not further explained.

As illustrated in FIG. 6, each of the glass plates 110 includes two main flat surfaces 111, 112, and a side surface 113 adjacent to the two main flat surfaces 111, 112. The two main flat surfaces 111, 112 are flat surfaces that are parallel to each other. The side surface 113 is a cross-sectional surface and is a flat surface orthogonal to the main flat surfaces 111, 112.

Similar to the glass plate 10 illustrated in FIG. 1, each of the main flat surfaces 111, 112 includes a compression stress layer having a predetermined depth from corresponding main flat surfaces 111, 112. A tensile stress layer is formed between the compression stress layers for maintaining balance of stress. Further, similar to the glass plate 10 illustrated in FIG. 1, tensile stress caused by chemically strengthening remains in an area of the side surface 113 in each of the glass plates 110. That is, each of glass plates 110 includes a tensile stress remaining area in the side surface 113.

As illustrated in FIG. 5, the glass plates 110 are formed having substantially the same shape and same dimension. The glass plates 110 are layered, so that the outer edges of the glass plates 110 are superposed when viewed from a layer direction of the layered body 130 (direction X in FIGS. 5 and 6). Thereby, the outer edge part of each of the glass plates 110 can be evenly polished.

Each of the spacers 120 is formed with a material that is softer than the glass plate 110. For example, the spacer 120 may be formed of a polypropylene resin or a urethane foam resin.

Each of the spacers 120 is formed having substantially the same shape and dimensions. Each of the spacers 120 is arranged more inward than the outer edges of the glass plates 110 in the layer direction of the layered body 130 (i.e. direction X in FIGS. 5 and 6). Thereby, the spacers 120 form groove-like spaces 160 between the glass plates 110.

The brush 140 is a brush roll as illustrated in FIG. 5. The brush 140 includes a rotation shaft 141 parallel to the layer direction of the layered body 130 and brush hairs 142 that are retained substantially orthogonal to the rotation shaft 141. The brush 140 is rotated about the rotation shaft 141 while being moved relative to the layered body 130 along the outer edge of the layered body 130. The brush 140 discharges a slurry containing a polishing material to the outer edge of the layered body 130 and polishes (brushes) the outer edge of the layered body 130. The polishing material may be, for example, cerium oxide or zirconia. The particle diameter (D50) of the polishing material may be, for example, less than or equal to 5 μm, and more preferably less than or equal to 2 μm.

The brush 140 is a channel brush that includes a long member (channel) spirally wound around the rotation axis 141. Multiple brush hairs 142 are attached to the channel.

The brush hair 142 is mainly formed of, for example, a resin such as a polyamide resin. The brush hair 142 may also include a polishing material such as alumina ($Al_2O_3$), silicon carbide, or diamond. The brush hair 142 may have a liner shape and include a tapered leading end part.

In this embodiment, the width W1 of the space 160 is greater than or equal to 1.25 times of the maximum diameter A of the brush hair 142 (W1≥1.25×A). Therefore, as illustrated in FIG. 6, the brush hair 142 can be smoothly inserted into the space 160, so that corner parts between the main flat surfaces 111, 112 and the side surface 113 can be chamfered into curved surfaces by the brush hairs 142.

The width W1 of the space 160 is preferably greater than or equal to 1.33×A, and more preferably greater than or equal to 1.5×A. In order to improve efficiency of the polishing (brushing) process, the width W1 of the space 160 may be smaller than the plate thickness E of the glass plate 110.

As illustrated with the solid line of FIG. 7, a glass plate 110A, which has been polished with the brush 140, includes two main flat surfaces 111A, 112A and a side surface 113A adjacent to the main flat surfaces 111A, 112A. The two main flat surfaces 111A, 112A are flat surfaces that are parallel to each other. The side surface 113A includes a flat part 114A that is orthogonal to the main flat surfaces 111A, 112A and chamfered parts 115A, 116A that are formed between the flat part 114A and corresponding main flat surfaces 111A, 112A. The chamfered parts 115A, 116A are curved surfaces that gradually protrude outward from corresponding main flat surfaces 111A, 112A to the flat part 114A.

The flat part 114A is formed by polishing a side surface of the glass plate 110 (indicated with the double-dot dash line in FIG. 7) with the soft brush hairs 142.

Because the side surface 113A of the glass plate 110 is formed by inserting the brush hairs 142 into the spaces adjusted by the spacers 120 and polishing the side surface 113 by discharging the slurry containing the polishing material having a particle diameter less than or equal to 5 μm, no pits having a depth greater than or equal to 1 exist in an etched surface of predetermined portions of the side surface 113A in a case where the predetermined portions are etched with a depth of 10 μm. The predetermined portions are portions of the side surface 13 in which the distance H (see FIG. 3) from corresponding main flat surfaces 111A, 112A (adjacent to the chamfered parts 115A, 116A, respectively) in the thickness direction of the glass plate 110A is less than or equal to ⅕ of the plate thickness E of the glass plate 110A. Therefore, similar to the first embodiment, the glass plate 110A having satisfactory flexural strength can be obtained.

<Third Embodiment>

The following embodiment also relates to a method for manufacturing a glass plate including a chamfered part. This embodiment further includes a step of grinding an outer part of a glass plate before forming a layered body.

Figure 8:
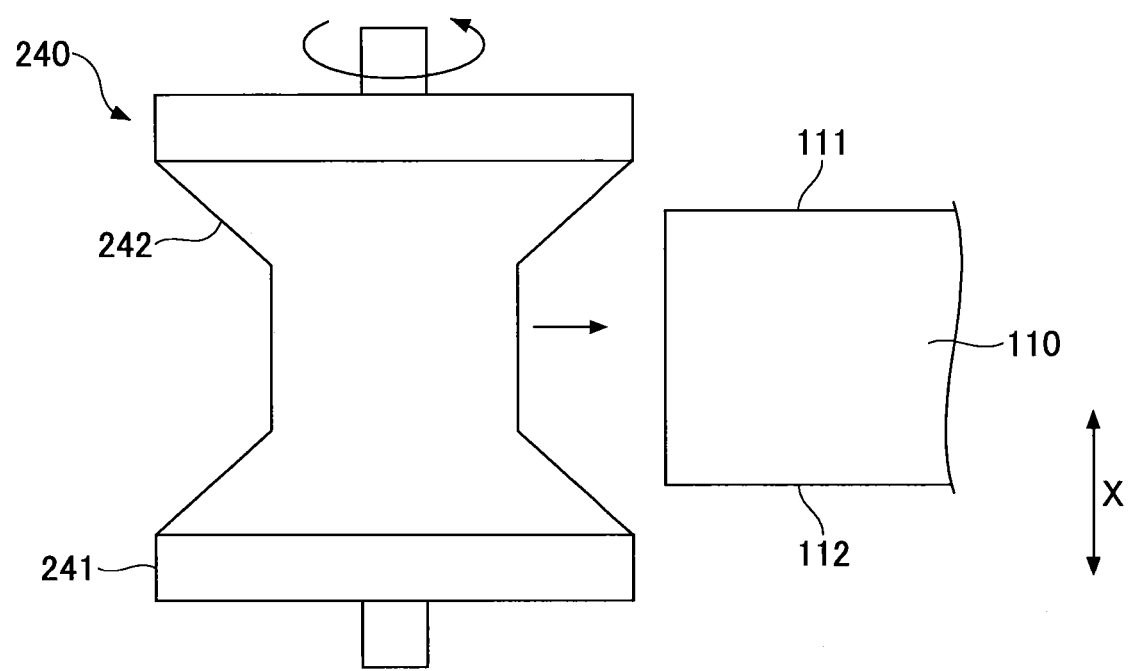
FIG. 8 is a schematic diagrams for describing a method for manufacturing a glass plate according to a third embodiment of the present invention (1)
Figure 9:
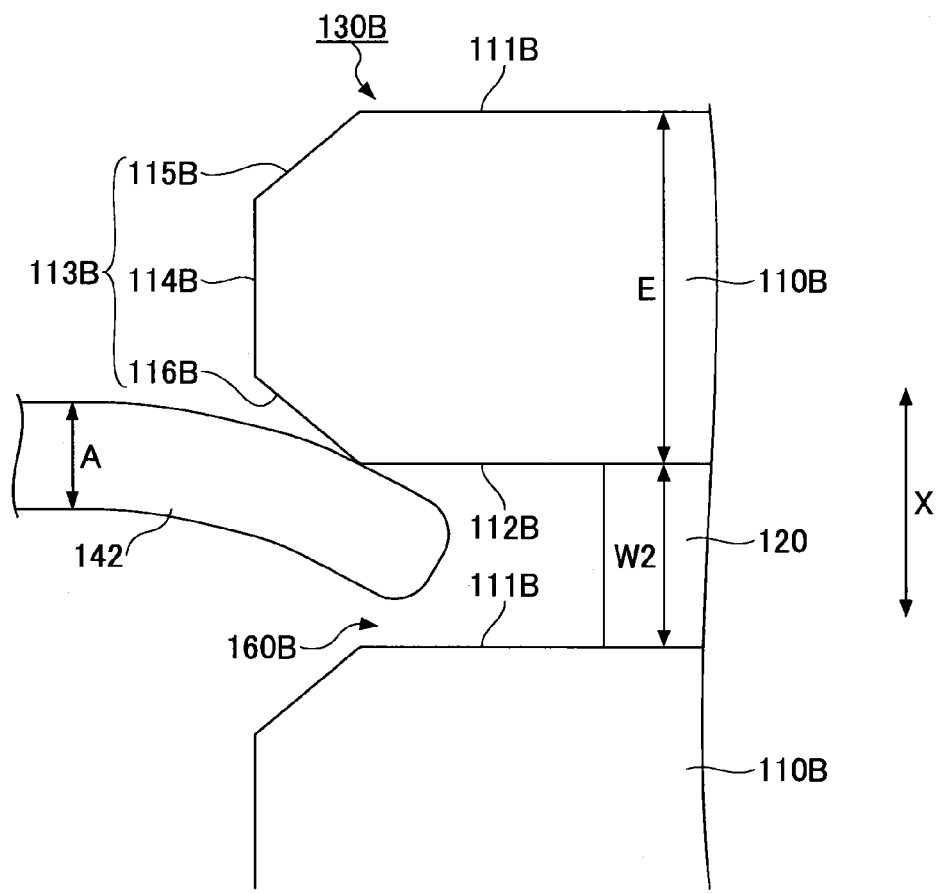
FIG. 9 is a schematic diagrams for describing a method for manufacturing a glass plate according to the third embodiment of the present invention (2)
Figure 10:
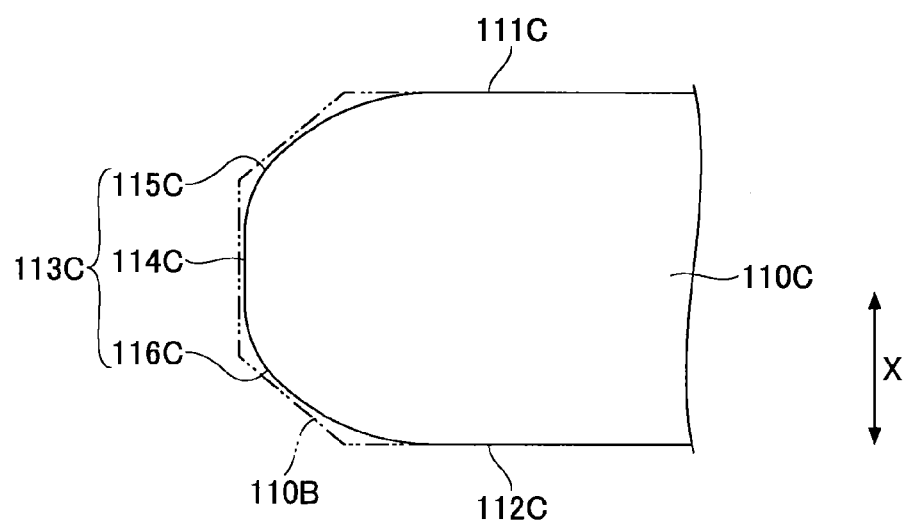
FIG. 10 is a schematic diagrams for describing a method for manufacturing a glass plate according to the third embodiment of the present invention (3)

FIGS. 8-10 are schematic diagrams for describing a method for manufacturing a glass plate according to a third embodiment of the present invention. FIG. 8 illustrates a glass plate (raw plate) 110 and a rotary grinding wheel 240 for polishing an outer edge of the glass plate 110. FIG. 9 is an enlarged view illustrating a state where an outer edge of a layered body 130B (including the glass plates 11 grinded with the rotary grinding wheel 240) is polished with the brush 140 (see FIG. 5). FIG. 10 illustrates the glass plate 110B (110C) in which a solid line indicates a state of the glass plate 110C after polishing (brushing) the glass plate 110B with the brush 140 whereas a dash-double dot line indicates a state of the glass plate 110B before polishing (brushing) the glass plate 110B with the brush 140.

The method for manufacturing a glass plate includes a step of grinding an outer edge part of the glass plate 110 with a disk-shaped rotary grinding wheel 240, a step of forming a layered body by arranging spacers 120 between the glass plates 110B obtained by grinding the glass plate 110, and a step of polishing an outer edge part of the layered body 130B with the brush 140. Further, the method for manufacturing a glass plate also includes a step of separating the spacers 120 and the glass plates 110C obtained by polishing the glass plates 110B with the brush 140.

An annular grinding groove 242, which extends in a peripheral direction of the rotary grinding wheel 240, is formed in an outer peripheral surface 241 of the rotary grinding wheel 240. A wall surface of the grinding groove 242 includes abrasive grains of, for example, alumina, silicon carbide, or diamond. The granularity of the abrasive grains may be, for example, #300 to #2000 (JIS R6001). The granularity is measured based on JIS R6002. Grinding efficiency is satisfactory because particle diameter increases as the granularity becomes smaller.

The rotary grinding wheel 240 is rotated about a center line of the rotary grinding wheel 240 while being moved relative to the glass plate 110 along the outer edge of the glass plate 110. Thereby, the outer edge part of the glass plate 110 is grinded by the side surface of the grinding groove 242. A coolant such as water may be used during the polishing process.

As illustrated in FIG. 9, the glass plate 110B grinded by the rotary grinding wheel 240 includes two main flat surfaces 111B, 112B, and a side surface 113B adjacent to the two main flat surfaces 111B, 112B. The side surface 113B is a polished surface polished by the rotary grinding wheel 240. The side surface 113B includes a flat part 114B orthogonal to the main flat surfaces 111B, 112B and chamfered parts 115B 116B formed between the flat part 114B and corresponding main flat surfaces 111B, 112B.

It is to be noted that, although the chamfered parts 115B, 116B are flat surfaces that are diagonal with respect to the main flat surfaces 111B, 112B, the chamfered parts 115B, 116B may be surfaces that gradually protrude outward (when viewed from a plate thickness direction (X direction)) from corresponding main flat surfaces 111B, 112B to the flat part 114B. The chamfered parts 115B, 116B may be curved surfaces. In a case where the chamfered parts 115B, 116B are curved surfaces, the flat part 114B may be omitted, so that the chamfered parts 115B, 116B are connected to each other. In this case, the chamfered parts 115B, 116B may have substantially the same curvature radius.

The layered body 130B includes multiple glass plates 110B grinded by the rotary grinding wheel 240 and plate-like spacers 120 interposed between the multiple glass plates 110B. The glass plates 110B and the spacers 120 are alternately provided one on top of the other and fixed to each other by being held (sandwiched) together with a jig such as a clamp. In order to prevent the glass plates 110B from being damaged, protection sheets may be provided between the glass plates 110B and the spacers 120. The protection sheet is formed of, for example, resin. Similar to the second embodiment, although the glass plates 110B and the spacers 120 are fixed to each other with a jig according to the third embodiment, other methods may be used for fixing the glass plates 110B and the spacers 120.

Each of the glass plates 110B grinded by the rotary grinding wheel 240 are formed having substantially the same shape and same dimensions. The glass plates 110B are layered, so that the outer edges of the glass plates 110B are superposed when viewed from a layer direction of the layered body 130B (direction X in FIG. 9). Thereby, the outer edge part of each of the glass plates 110B can be evenly polished. A coolant such as water may be used during the polishing process.

Each of the spacers 120 is formed having substantially the same shape and dimensions. Each of the spacers 120 is arranged more inward than the polished surfaces (flat part 114B, chamfered parts 115B, 116B) of the glass plates 110B in the layer direction of the layered body 130 (i.e. direction X in FIG. 9). Thereby, the spacers 120 form groove-like spaces 160B between the glass plates 110B.

In this embodiment, similar to the second embodiment, the width W2 of the space 160B is greater than or equal to 1.25 times of the maximum diameter A of the brush hair 142 (W2≥1.25×A). Therefore, as illustrated in FIG. 9, the brush hair 142 can be smoothly inserted into the space 160B, so that border parts between the main flat surfaces 111B, 112B and corresponding chamfered parts 115B, 116B can be chamfered into curved surfaces by the brush hairs 142. In addition, border parts between the chamfered parts 115B, 116B and the flat part 114B are also chamfered into curved surfaces by the brush hairs 142.

The width W2 of the space 160B is preferably greater than or equal to 1.33×A, and more preferably greater than or equal to 1.5×A. In order to improve efficiency of the polishing (brushing) process, the width W2 of the space 160B may be smaller than the plate thickness E of the glass plate 110B.

As illustrated with the solid line of FIG. 10, a glass plate 110C, which has been polished with the brush 140 (see FIG. 5), includes two main flat surfaces 111C, 112C and a side surface 113C adjacent to the main flat surfaces 111C, 112C. The two main flat surfaces 111C, 112C are flat surfaces that are parallel to each other. The side surface 113C includes a flat part 114C that is orthogonal to the main flat surfaces 111C, 112C and chamfered parts 115C, 116C that are formed between the flat part 114C and corresponding main flat surfaces 111C, 112C. The chamfered parts 115C, 116C are curved surfaces that gradually protrude outward from corresponding main flat surfaces 111C, 112C to the flat part 114C.

Because the side surface 113C of the glass plate 110C is formed by inserting the brush hair 142 into the spaces adjusted by the spacers 120 and polishing the side surface 113C by discharging the slurry containing the polishing material having a particle diameter less than or equal to 5 μm, no pits having a depth greater than or equal to 1 μm exist in an etched surface of predetermined portions of the side surface 113C in a case where the predetermined portions are etched with a depth of 10 μm. The predetermined portions are portions of the side surface 113C in which a distance H from corresponding main flat surfaces 111C, 112C (adjacent to the chamfered parts 115C, 116C, respectively) in the thickness direction of the glass plate 110C is less than or equal to ⅕ of the plate thickness of the glass plate 110C. Therefore, similar to the first embodiment, the glass plate 110C having satisfactory flexural strength can be obtained.

<Fourth Embodiment>

The following embodiment also relates to a method for manufacturing a glass plate including a chamfered part. This embodiment includes a step of grinding a glass plate with a sheet including abrasive grains instead of performing a step of polishing the glass plate with a brush.

Figure 11:
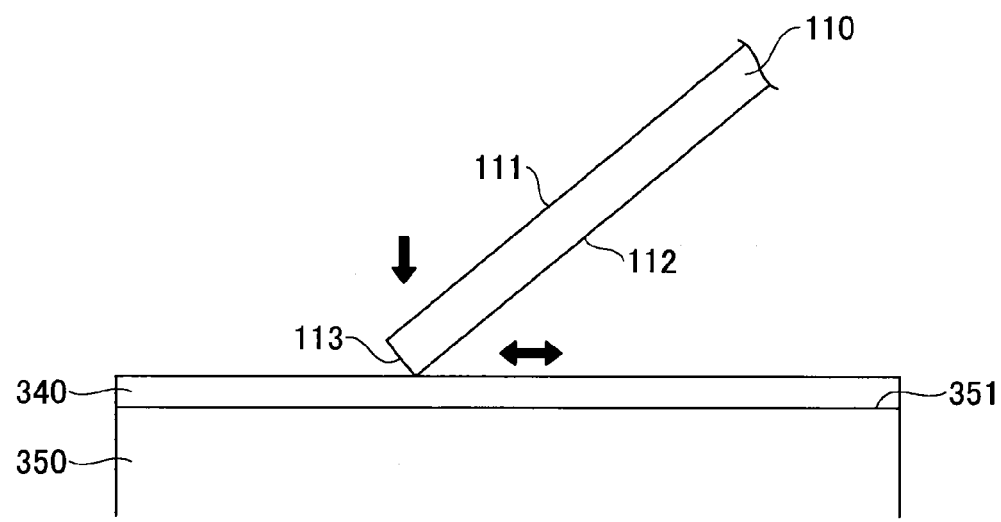
FIG. 11 is a schematic diagram for describing a method for manufacturing a glass plate according to a fourth embodiment of the present invention (1)
Figure 12:
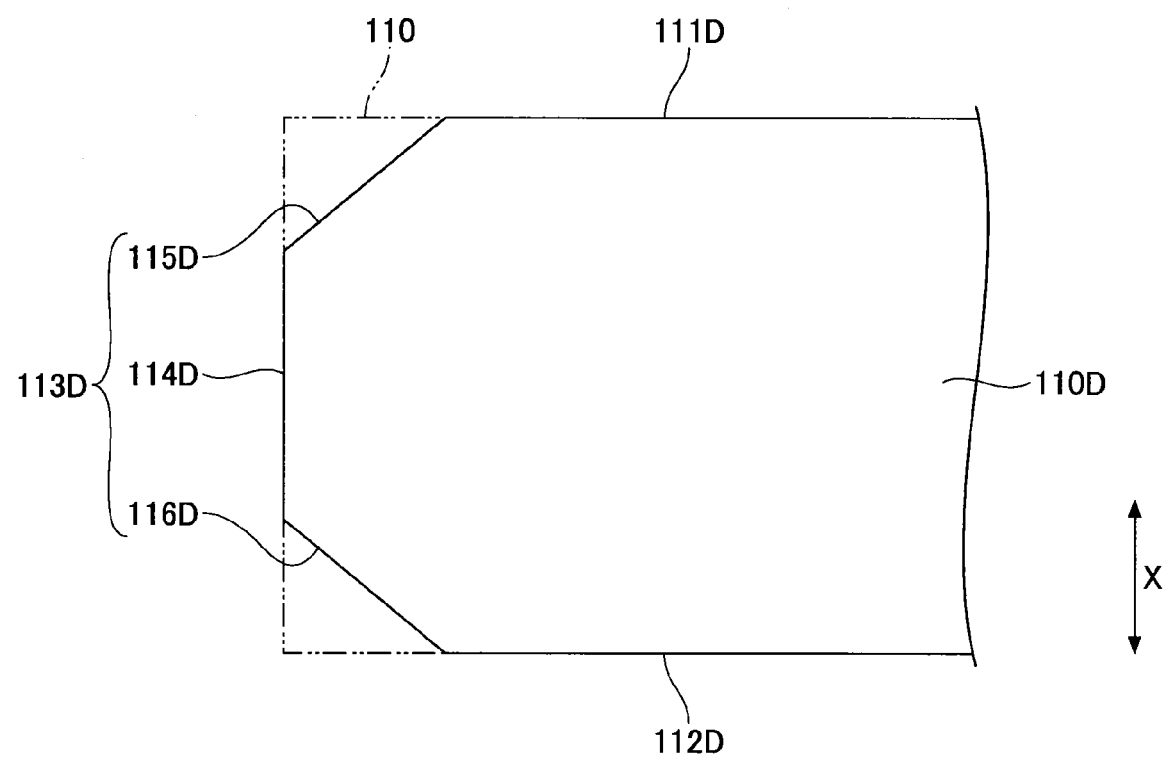
FIG. 12 is a schematic diagram for describing a method for manufacturing a glass plate according to the fourth embodiment of the present invention (2).

FIGS. 11-12 are schematic diagrams for describing a method for manufacturing a glass plate according to a fourth embodiment of the present invention. FIG. 11 illustrates a glass plate (raw plate) 110 and a sheet 340 for polishing the glass plate 110. FIG. 12 illustrates the glass plate 110D (110) in which a solid line indicates a state of the glass plate 110D after polishing the glass plate 110 with the sheet 340 whereas a dash-double dot line indicates a state of the glass plate 110 before polishing the glass plate 110 with the sheet 340.

The method for manufacturing a glass plate in the fourth embodiment includes a step of polishing an outer edge part of the glass plate 110 with a sheet 340 including abrasive grains. The sheet 340 may be a sheet-like base material (e.g., resin, paper) having abrasive grains evenly adhered thereto. Alternatively, the sheet 340 may be a sheet-like resin material having a configuration in which a portion of abrasive grains buried in the sheet-like resin material is exposed.

The sheet 340 is fixed to a fixing surface 351 of a base 350. The sheet 340 has a shape complying with the shape of the fixing surface 351. The fixing surface 351 may be a flat surface as illustrated in FIG. 11 or a curved surface.

The sheet 340 includes abrasive grains provided on a surface that is opposite to a surface facing the fixing surface 351. The glass plate 110 is polished by pressing the glass plate 110 against the surface including the abrasive grains while sliding the glass plate 110 along the surface including the abrasive grains. A coolant such as water may be used during the polishing process.

It is to be noted that, although the sheet 340 of this embodiment is fixed on the base 350 and has its surface including abrasive grains pressed against the glass plate 110 while the glass plate 110 is slid along the surface of the containing abrasive grains, the glass plate 110 may be pressed against the surface including abrasive grains in a state where tension is applied to the sheet 340.

The abrasive grains of the sheet 340 may be, for example, alumina, silicon carbide, or diamond. The granularity of the abrasive grains may be, for example, greater than or equal to #6000 (JIS R6001). Grinding efficiency is satisfactory because particle diameter increases as the granularity becomes smaller. The granularity is measured based on JIS R6002. The granularity of the abrasive grains is preferably greater than or equal to #8000, and more preferably greater than or equal to #10000.

As illustrated with the solid line of FIG. 12, a glass plate 110D, which has been polished with the sheet 340 (see FIG. 11), includes two main flat surfaces 111D, 112D and a side surface 113D adjacent to the main flat surfaces 111D, 112D. The two main flat surfaces 111D, 112D are flat surfaces that are parallel to each other. The side surface 113D includes a flat part 114D that is orthogonal to the main flat surfaces 111D, 112D and chamfered parts 115D, 116D that are formed between the flat part 114D and corresponding main flat surfaces 111D, 112D. The chamfered parts 115D, 116D are surfaces that gradually protrude outward from corresponding main flat surfaces 111D, 112D to the flat part 114D. The chamfered parts 115D, 116D are flat surfaces that are diagonal with respect to the main flat surfaces 111D, 112D.

Because the flat part 114D is unprocessed and remains as a cross-sectional surface, no micro-scratches are formed in the flat part 114D. Alternatively, the flat part 114D may be formed by polishing the glass plate 110 with the sheet 340.

The chamfered parts 115D, 116D are formed with the sheet 340 including abrasive grains that have a granularity larger (smaller particle diameter) than a related art example (smaller particle diameter).

Because the side surface 113D of the glass plate 110D is formed by polishing the side surface 113D with the sheet 340 including abrasive grains that have a granularity larger (smaller particle diameter) than a related art example (smaller particle diameter), no pits having a depth greater than or equal to 1 μm exist in an etched surface of predetermined portions of the side surface 113D in a case where the predetermined portions are etched with a depth of 10 μm. The predetermined portions are portions of the side surface 113D in which a distance from corresponding main flat surfaces 111D, 112D (adjacent to the chamfered parts 115D, 116D, respectively) in the thickness direction of the glass plate 110D is less than or equal to ⅕ of the plate thickness of the glass plate 110D. Therefore, similar to the first embodiment, the glass plate 110D having satisfactory flexural strength can be obtained.

WORKING EXAMPLES

Example 1

In example 1, a glass plate having a predetermined size (length 60 mm, width 40 mm, thickness 0.8 mm) was formed by chemically strengthening a plate glass, cutting the plate glass, and chamfering the plate glass by using the method described in the second embodiment.
<Chemical Strengthening>
A flat plate glass having a thickness of 0.8 mm was prepared as the plate glass for performing chemical strengthening. The composition of the plate glass in mass percent (mol. %) was 64.2% of Si, 8.0% of $Al_2O_3$, 10.5% of MgO, 12.5% of $Na_2O$, 4.0% of $K_2O$, 0.5% of $ZrO_2$, 0.1% of CaO, 0.1% of SrO, and 0.1% of BaO.

The prepared flat plate glass was chemically strengthened by performing an ion exchange process on the glass plate by immersing the plate glass in a $KNO_3$ molten salt and then cooling the glass plate to a temperature close to room temperature. The temperature of the $KNO_3$ molten salt was 435° C., and the time of the immersion was 4 hours.

The surface compression stress and the thickness of the chemically strengthened layer of the plate glass was measured with a surface stress meter (FSM-6000LE, manufactured by: Orihara Industrial Co., Ltd.). Further, the average tensile stress of the tensile stress layer was calculated by substituting the measurement results of the surface stress meter into the above-described Expression (1).

As a result of the measurement, the two compression stress layers had the same surface compression stress (S1=S2=750 MPa) and the same thickness (D1=D2=45 μm). The thickness of the compression stress layer was 45/800 of the thickness of the glass plate (approximately 1/18). The tensile stress layer included a portion in which the distance between the main flat surfaces of the glass plate in the thickness direction was less than or equal to ⅕ of the plate thickness of the glass plate. The average tensile stress of the tensile stress layer was 48 MPa.
<Cutting>
The plate glass obtained by the chemical strengthening process was cut by using a laser cutting method. A fiber laser (wavelength band: 1075 nm to 1095 nm) was used as a laser source. The laser beam radiated from the laser source formed a beam spot having a diameter of 0.3 mm on the surface of the plate glass. The beam spot was moved relative to the plate glass along a target cutting line of the plate glass at a rate of 10 mm/s. An initial crack was formed in the plate glass beforehand with a file at a start point of the target cutting line.
<Chamfering>
Glass plates obtained by the cutting process were formed into a layered body by alternately providing the glass plates and spacers one on top of the other and fixing the glass plates and spacers to each other by sandwiching the glass plates and the spacers with a jig. The widths of the spaces formed by arranging the spacers between the glass plates were 0.5 mm. The maximum diameter of the brush hairs made of polyamide was 0.3 mm. The widths of the spaces between the glass plates were 1.7 times of the maximum diameter of the brush hairs. The outer edge part of the layered body was polished with a brush while discharging a slurry containing a polishing material of cerium oxide having an average particle diameter (D50) of 2 μm. Then, the jig holding the glass plates and the spacers together were removed. Thereby, glass plates, which have rounded chamfered corner parts between the corner surface and main flat surfaces, were obtained.

Each of the glass plates obtained by the chamfering process includes two substantially rectangular main flat surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.
<Evaluation>
The following evaluation was performed on the glass plate obtained by the chamfering process. Results of the evaluation are shown below in Table 1.

Flexural strength was measured by a 4 point bending test (JIS R1601) at room temperature. The interval between 2 support points was 40 mm, and the interval between 2 load points was 10 mm. Flexural strength was obtained from the average value of the flexural strengths of 10 specimens.

After performing the 4 point flexural strength test on the specimens, an etching process was performed on the specimens. The etching process was performed by immersing the specimens with an etching liquid including 5% by mass of hydrofluoric acid and 95% by mass of pure water, for 2 minutes at room temperature. The etching amount became 10 μm by immersing the specimens for 2 minutes.

The depths of the pits in the etching surfaces of the etched specimens were measured by using a nanosearch microscope (OLS 65000, manufactured by Olympus Corp.) for determining whether pits having depths greater than or equal to 1 μm exist in predetermined portions of a side surface. The predetermined portions are portions of the side surface in which a distance from corresponding main flat surfaces in a thickness direction of a glass plate is less than or equal to ⅕ of a plate thickness of the glass plate. The predetermined portions included an area in which tensile stress caused by chemically strengthening remains.

Example 2

In example 2, a glass plate having a predetermined size was formed with the similar conditions as example 1 except that the chamfering method described in the third embodiment is used instead of the chamfering method described in the second embodiment. More specifically, glass plates obtained by cutting are grinded by using a rotary grinding wheel before performing a polishing process using a brush. It is to be noted that the conditions for performing the polishing process with the brush are similar to those described in example 1.

A rotary grinding wheel, which includes a grinding groove having diamond abrasive grains provided in a side surface of the grinding groove, was used. The granularity of the diamond abrasive grains was #400. The glass plates grinded by the rotary grinding wheel were formed into a layered body by alternately providing the glass plates and spacers one on top of the other and fixing the glass plates and spacers to each other by sandwiching the glass plates and the spacers with a jig. Each of the spacers were arranged more inward than the grinded surfaces of the glass plates in the layer direction of the layered body. The widths of the spaces formed by arranging the spacers between the glass plates were 0.5 mm. The maximum diameter of the brush hairs made of polyamide was 0.3 mm. The widths of the spaces between the glass plates were 1.7 times of the maximum diameter of the brush hairs. The outer edge part of the layered body was polished with a brush while discharging a slurry containing a polishing material of cerium oxide having an average particle diameter (D50) of 2 μm. Then, the jig holding the glass plates and the spacers together was removed. Thereby, chamfered glass plates were obtained.

Each of the glass plates obtained by the chamfering process includes two substantially rectangular main flat surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.

Similar to example 1, evaluation was performed on the glass plate obtained by the above-described chamfering process. Results of the evaluation are shown below in Table 1.

Example 3

In example 3, a glass plate having a predetermined size was formed with the similar conditions as example 1 except that the method described in the fourth embodiment is used instead of the method described in the second embodiment. More specifically, glass plates obtained by cutting were grinded by using a sheet including abrasive grains.

A sheet including silicon carbide abrasive grains was used (wrapping film sheet 1 μm (#8000)). The granularity of the abrasive grains was #80000.

Each of the glass plates obtained by the chamfering process includes two substantially rectangular main flat surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.

Similar to example 1, evaluation was performed on the glass plate obtained by the above-described chamfering process. Results of the evaluation are shown below in Table 1.

Example 4

In example, 4, a glass plate having a predetermined size was formed with the similar conditions as example 2 except that a rotary grinding wheel without grinding grooves was used instead of a rotary grinding wheel including grinding grooves.

A rotary grinding wheel, which includes diamond abrasive grains provided in an outer peripheral surface of the rotary grinding wheel, was used. The granularity of the diamond abrasive grains was #700. Glass plates, which were grinded with the rotary grinding wheel, included side surfaces orthogonal to the main flat surfaces and had substantially the same shapes as the shape of the raw plate 110 illustrated with the double-dot dash line of FIG. 7. Then, glass plates having substantially the same shapes as the glass plate 110A illustrated with the solid line of FIG. 7 were obtained by polishing with the brush.

Each of the glass plates obtained by the chamfering process includes two substantially rectangular main surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.

Similar to example 1, evaluation was performed on the glass plate obtained by the above-described chamfering process. Results of the evaluation are shown below in Table 1.

Example 5

In example 5, a glass plate having a predetermined size was formed with the similar conditions as example 2 except that a sheet including silicon carbide abrasive grains having a granularity of #1000 was used instead of the rotary grinding wheel including grinding grooves.

Glass plates having substantially the same shapes as the glass plate 110B illustrated with the double-dot dash line of FIG. 10 were obtained by polishing with the sheet. Then, glass plates having substantially the same shapes as the glass plate 110C illustrated with the solid line of FIG. 10 were obtained by polishing with the brush.

Each of the glass plates obtained by the chamfering process includes two substantially rectangular main flat surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.

Similar to example 1, evaluation was performed on the glass plate obtained by the above-described chamfering process. Results of the evaluation are shown below in Table 1.

Example 6

In example 6, a glass plate having a predetermined size was formed with the similar conditions as example 5 except that an outer edge part of a glass plate was grinded with a rotary grinding wheel having no grinding groove before polishing the glass plate with a sheet.

A rotary grinding wheel, which includes diamond abrasive grains provided in an outer peripheral surface of the rotary grinding wheel, was used. The granularity of the diamond abrasive grains was #700. Glass plates, which were grinded with the rotary grinding wheel, included side surfaces orthogonal to the main flat surfaces and had substantially the same shapes as the shape of the raw plate 110 illustrated with the double-dot dash line of FIG. 7. Then, glass plates having substantially the same shapes as the glass plate 110B illustrated with the double-dot dash line of FIG. 10 were obtained by polishing with the sheet. Then, glass plates having substantially the same shapes as the glass plate 110C illustrated with the solid line of FIG. 10 were obtained by polishing with the brush.

Each of the glass plates obtained by the chamfering process includes two substantially rectangular main flat surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.

Similar to example 1, evaluation was performed on the glass plate obtained by the above-described chamfering process. Results of the evaluation are shown below in Table 1.

Example 7 in example 7, a glass plate having a predetermined size was formed with the similar conditions as example 2 except that polishing with a brush was not performed after cut glass plates were grinded with a rotary grinding wheel. This glass plate includes two substantially rectangular main flat surfaces that are parallel to each other, and four side surfaces adjacent to the two corresponding main flat surfaces. Each of the side surfaces includes a flat part that is orthogonal to the two main flat surfaces and chamfered parts formed between the flat part and corresponding main flat surfaces. The tensile stress remaining area partly superposes a portion of each side surface in which the distance from the main flat surface in the thickness direction of the glass plate is less than or equal to ⅕ of the plate thickness of the glass plate.

Similar to example 1, evaluation was performed on the glass plate obtained by the above-described chamfering process. Results of the evaluation are shown below in Table 1.

TABLE 1

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| EXISTENCE OF PITS | NO | NO | NO | NO | NO | NO | YES |
| FLEXURAL STRENGTH (MPa) | 700 | 350 | 500 | 600 | 650 | 550 | 160 |

According to Table 1, it can be understood that, in a case where predetermined portions of the side surface of the glass plate are etched with a depth of 10 μm, specimens, which do not include pits having a depth greater than or equal to 1 μm in their etched surface, have high flexural strength.

Although embodiments of a glass plate and methods for manufacturing the glass plate have been described above, the present invention is not limited to these embodiments, but various variations and modifications may be made without departing from the scope of the present invention.

For example, although the outer peripheral surface of the rotary grinding wheel of the third embodiment is formed with the grinding grooves, the rotary grinding wheel may be formed without the grinding grooves. In a case where the rotary grinding wheel does not include grinding grooves, the side surface grinded by the outer peripheral surface of the rotary grinding wheel becomes orthogonal to the main flat surface. Therefore, in a case where the rotary grinding wheel does not include grinding grooves, the glass plate has substantially the same shape as the shape of the raw plate 110 illustrated with the double-dot dash line of FIG. 7 by the grinding process. Then, the glass plate having substantially the same shape as the glass plate 110A illustrated with the solid line of FIG. 7 was obtained by polishing with the sheet.

Further, in the third embodiment, corner parts of the glass plate may be polished with the sheet instead of being grinded with the rotary grinding wheel including polishing grooves. Thereby, the glass plate has substantially the same shape as the shape of the glass plate 110B illustrated with the double-dot dash line of FIG. 10 by being polished with the sheet. Then, the glass plate having substantially the same shape as the glass plate 110C illustrated with the solid line of FIG. 10 was obtained by polishing with the brush. In this case, unlike the fourth embodiment, the granularity of the abrasive grains included in the sheet may be greater than or equal to #1000.

Further, in the third embodiment, corner parts of the glass plate may be polished with the sheet after the glass plate is grinded with the rotary grinding wheel including no polishing grooves instead of grinding with the rotary grinding wheel including polishing grooves. Thereby, the glass plate has substantially the same shape as the shape of the glass plate 110B illustrated with the double-dot dash line of FIG. 10 by being polished with the sheet. Then, the glass plate having substantially the same shape as the glass plate 110C illustrated with the solid line of FIG. 10 was obtained by polishing with the brush In this case, unlike the fourth embodiment, the granularity of the abrasive grains included in the sheet may be greater than or equal to #1000.

What is claimed is:

1. A glass plate comprising:

two main flat surfaces;

a side surface adjacent to the two main flat surfaces, and a chemically strengthened layer in at least one of the two main flat surfaces, wherein at least one edge part of the side surface includes a chamfered part in a thickness direction of the glass plate, wherein the side surface includes a predetermined portion, wherein the glass plate has a property such that an etched surface of the predetermined portion includes no pit having a depth greater than or equal to 1 μm when the predetermined portion is etched with a depth of 10 μm and a depth of a pit in the etched surface of the predetermined portion is measured, the pit has no microscratch that is a source of breaking, wherein the predetermined portion is a portion of the side surface in which a distance from one of the two main flat surfaces adjacent to the chamfered part in the thickness direction of the glass plate is less than or equal to ⅕ of the thickness of the glass plate, and wherein a flexural strength of the glass plate is greater than or equal to 300 MPa.

2. The glass plate as claimed in claim 1, wherein the side surface includes an area in which tensile stress caused by chemically strengthening remains.

3. The glass plate as claimed in claim 2, wherein the predetermined portion of the side surface partly superposes the area in which tensile stress caused by chemically strengthening remains.

4. The glass plate of claim 1, wherein the chamfered part is a flat surface and is diagonal with at least one main flat surface, or each edge part includes a chamfered part each of which is an outwardly curved surface and the chamfered parts are connected to each other omitting a flat part of the side surface.

5. The glass plate of claim 1, wherein two edge parts of the side surface include a chamfered part in a thickness direction of the glass plate.

* * * * *